(12) United States Patent
Araki et al.

(10) Patent No.: US 8,031,283 B2
(45) Date of Patent: Oct. 4, 2011

(54) ACTIVE MATRIX SUBSTRATE AND METHOD OF MANUFACTURING THE SAME

(75) Inventors: Toshio Araki, Kumamoto (JP); Osamu Miyakawa, Kumamoto (JP); Nobuaki Ishiga, Kumamoto (JP); Shingo Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 157 days.

(21) Appl. No.: 12/353,480

(22) Filed: Jan. 14, 2009

(65) Prior Publication Data

US 2009/0195723 A1 Aug. 6, 2009

(30) Foreign Application Priority Data

Jan. 31, 2008 (JP) .................................. 2008-020505

(51) Int. Cl.
G02F 1/136 (2006.01)
(52) U.S. Cl. .............................. 349/43; 349/141; 349/38
(58) Field of Classification Search .......................... None
See application file for complete search history.

(56) References Cited

U.S. PATENT DOCUMENTS

| | | | |
|---|---|---|---|
| 6,016,174 A | 1/2000 | Endo et al. | |
| 2001/0050745 A1* | 12/2001 | Liu et al. | 349/141 |
| 2002/0008829 A1* | 1/2002 | Matsumoto | 349/141 |
| 2002/0089631 A1* | 7/2002 | Lee et al. | 349/141 |
| 2004/0046905 A1* | 3/2004 | Hong et al. | 349/43 |
| 2004/0169808 A1* | 9/2004 | Shih et al. | 349/141 |
| 2007/0153203 A1* | 7/2007 | Kim et al. | 349/141 |
| 2009/0103035 A1* | 4/2009 | Suzuki et al. | 349/141 |
| 2009/0109356 A1* | 4/2009 | Kitagawa | 349/33 |

FOREIGN PATENT DOCUMENTS

| | | |
|---|---|---|
| JP | 5-265039 | 10/1993 |
| JP | 7-20491 | 1/1995 |
| JP | 10-268353 | 10/1998 |

* cited by examiner

*Primary Examiner* — (Nancy) Thanh-Nhan P Nguyen
(74) *Attorney, Agent, or Firm* — Oblon, Spivak, McClelland, Maier & Neustadt, L.L.P.

(57) ABSTRACT

An active matrix substrate according to one aspect of the present invention is a TFT array substrate including a TFT. The active matrix substrate includes a gate signal line electrically connected to a gate electrode of the TFT, a first insulating film formed above the gate signal line, an auxiliary capacitance electrode formed above the first insulating film and supplied with a common potential, a second insulating film formed above the auxiliary capacitance electrode, a source signal line formed above the second insulating film and electrically connected to a source electrode of the TFT, a third insulating film formed above the source signal line, and a pixel electrode formed above the third insulating film so that the pixel electrode overlaps with a part of the auxiliary capacitance electrode.

14 Claims, 11 Drawing Sheets

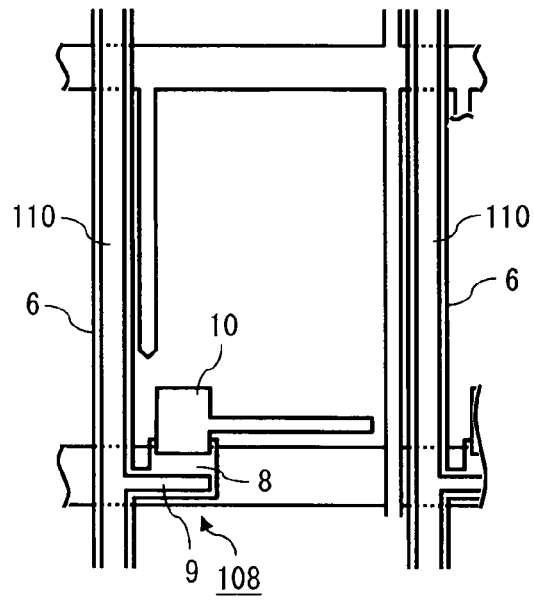 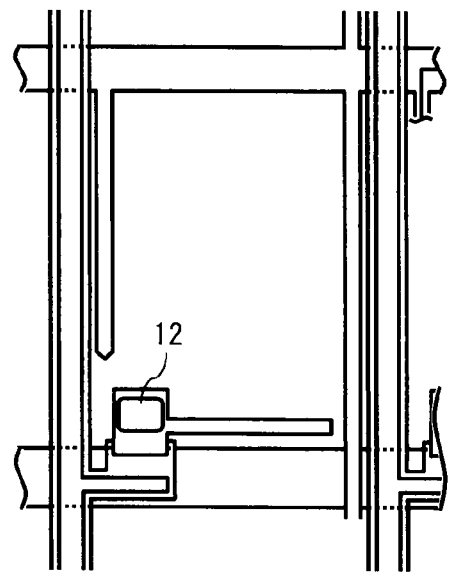
Fig. 5D     Fig. 5E
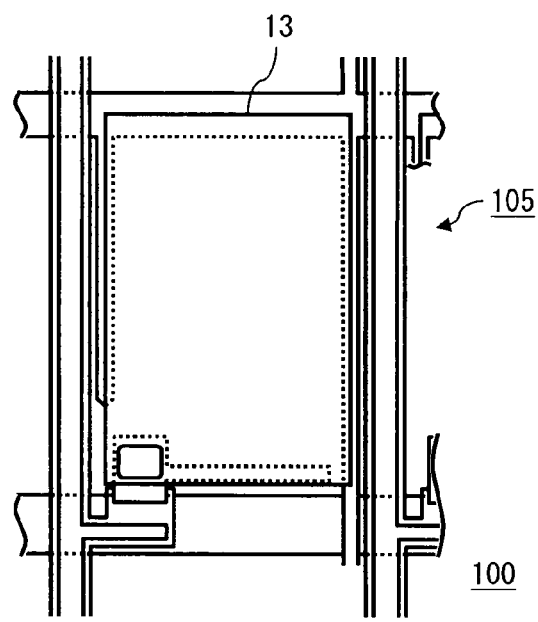
Fig. 5F

ACTIVE MATRIX SUBSTRATE AND METHOD OF MANUFACTURING THE SAME

BACKGROUND OF THE INVENTION

1. Field of the Invention

The present invention relates to an active matrix substrate and a method of manufacturing the same.

2. Description of Related Art

An active matrix type display element is known as one of electro-optic display elements such as liquid crystal or organic EL. In the active matrix type display element, a switching element such as TFT is arranged on one principal surface of an insulating substrate, and independent voltage and electric field are applied to each pixel.

In the electro-optic display elements, it is important to realize the active matrix substrate in which a display area of each pixel is as large as possible, or aperture ratio is high, in order to realize clear display with high quality.

Now, a method of manufacturing a TFT array substrate which is an active matrix substrate will be described with reference to FIG. 10. FIG. 10 is a cross sectional view schematically showing the structure of a TFT array substrate 100. First, a conductive film is formed on an insulating substrate 1. Then, the conductive film is patterned by a photolithography process. Thus, a gate electrode 2, a gate signal line, and an auxiliary capacitance electrode 4 are formed on the insulating substrate 1. Next, a first insulating film 3 and a second insulating film 5 are successively formed. Next, a semiconductor active film 6 and an ohmic contact film 7 are successively formed. Then, the semiconductor active film 6 and the ohmic contact film 7 are patterned by the photolithography process.

Next, a metallic thin film is formed. Then, the metallic thin film is patterned by the photolithography process. Thus, a source electrode 9, a source signal line 110, and a drain electrode 10 are formed on the ohmic contact film 7. Then, the ohmic contact film 7 is etched by using the pattern of the drain electrode 10, the source signal line 110, and the source electrode 9 as a mask. Thus, a channel portion 8 is formed. Next, a third insulating film 11 is formed so as to cover them. Then, the third insulating film 11 is patterned by the photolithography process. Thus, a contact hole 12 is formed on the drain electrode 10. After that, the conductive film is formed. Then, the conductive film is patterned by the photolithography process. As such, a pixel electrode 13 that is connected to the drain electrode 10 by the contact hole 12 is formed. The TFT array substrate 100 is thus manufactured.

As stated above, when the active matrix substrate is formed by five photolithography processes, the gate electrode 2, the gate signal line, and the auxiliary capacitance electrode 4 are formed in the same process at the same time. The method of forming them at the same time is disclosed, for example, in Japanese Unexamined Patent Application Publication No. 10-268353. In such a case, the gate electrode 2, the gate signal line, and the auxiliary capacitance electrode 4 are formed by the conductive film of the same material. The gate electrode 2 and the gate signal line are preferably made of low-resistance material so as not to delay the gate signal. Thus, the metallic thin film should be used as the gate electrode 2 and the gate signal line. Thus, the gate electrode 2, the gate signal line, and the auxiliary capacitance electrode 4 are formed of the metallic thin film. As the metallic thin film interrupts light, there is a limit to increase the aperture ratio. Further, in the method described above, the gate electrode 2, the gate signal line, and the auxiliary capacitance electrode 4 are formed in the same layer, which may cause short defect.

SUMMARY OF THE INVENTION

The present invention has been made to overcome the above-described problem, and one of the objects of the present invention is to provide an active matrix substrate having excellent property, and a method of manufacturing the same.

According to a first aspect of the present invention, there is provided an active matrix substrate including a TFT, the active matrix substrate including a gate signal line electrically connected to a gate electrode of the TFT, a first insulating film formed above the gate signal line, a common electrode formed above the first insulating film and supplied with a common potential, a second insulating film formed above the common electrode, a source signal line formed above the second insulating film and electrically connected to a source electrode of the TFT, a third insulating film formed above the source signal line, and a pixel electrode formed above the third insulating film so that the pixel electrode overlaps with a part of the common electrode.

According to a second aspect of the present invention, there is provided a method of manufacturing an active matrix substrate including a TFT, the method including forming a gate signal line electrically connected to a gate electrode of the TFT, forming a first insulating film above the gate signal line, forming a common electrode above the first insulating film, the common electrode being supplied with a common potential, forming a second insulating film above the common electrode, forming a source signal line above the second insulating film, the source signal line being electrically connected to a source electrode of the TFT, forming a third insulating film above the source signal line, and forming a pixel electrode above the third insulating film so that the pixel electrode overlaps with a part of the common electrode.

According to the present invention, it is possible to provide an active matrix substrate having excellent property, and a method of manufacturing the same.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 5A to 5F are top schematic views showing the structure of the pixel in the manufacturing process of the TFT array substrate according to the first embodiment;

DESCRIPTION OF THE PREFERRED EMBODIMENTS

First Embodiment

Figure 1:
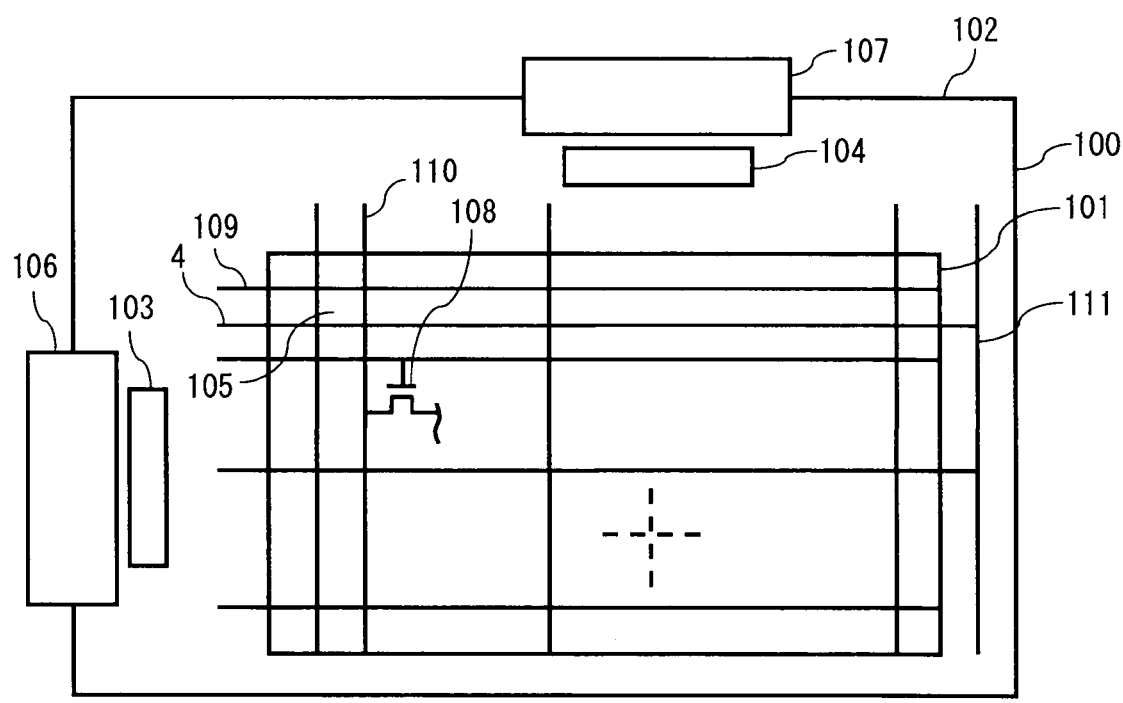
FIG. 1 is a schematic plan view of the structure of a TFT array substrate according to a first embodiment.

Referring to FIG. 1, an active matrix substrate according to the first embodiment of the present invention will be described. The active matrix substrate according to the first embodiment is a TFT array substrate employing a TFT as a switching element. FIG. 1 is a schematic plan view showing the structure of a TFT array substrate 100. The TFT array substrate 100 is used for an electro-optic display device such as a liquid crystal display device or an EL display device (electroluminescent display device). Further, the EL display devices are classified into an organic EL display device and an inorganic EL display device. Hereinbelow, the TFT array substrate 100 used in the liquid crystal display device will be described.

The TFT array substrate 100 has a display region 101 and a frame region 102 surrounding the display region 101. In the display region 101, a plurality of gate signal lines (scanning signal lines) 109, a plurality of source signal lines (display signal lines) 110, and a plurality of auxiliary capacitance electrodes 4 are formed. The plurality of gate signal lines 109 and the auxiliary capacitance electrodes 4 are arranged in parallel. Likewise, the plurality of source signal lines 110 are arranged in parallel. The auxiliary capacitance electrodes 4 that function as common electrodes are each arranged between the adjacent gate signal lines 109. In summary, the gate signal lines 109 and the auxiliary capacitance electrodes 4 are alternately arranged.

The gate signal lines 109 and the source signal lines 110 cross each other. The gate signal lines 109 and the source signal lines 110 are orthogonal to each other. Likewise, the auxiliary capacitance electrodes 4 and the source signal lines 110 cross each other. The auxiliary capacitance electrodes 4 and the source signal lines 110 are orthogonal to each other. Further, although not shown in FIG. 1, a part of the auxiliary capacitance electrode 4 preferably extends parallel to the source signal line 110. In this case, the gate signal lines 109 and the auxiliary capacitance electrodes 4 cross each other. The gate signal lines 109 and the auxiliary capacitance electrodes 4 are orthogonal to each other. A region surrounded by the gate signal line 109, the auxiliary capacitance electrode 4, and the adjacent source signal lines 110 is a pixel 105. Thus, the pixels 105 are arranged in matrix in the TFT array substrate 100.

Further, the frame region 102 of the TFT array substrate 100 includes a scanning signal driving circuit 103 and a display signal driving circuit 104. The gate signal line 109 extends from the display region 101 to the frame region 102. Then, the gate signal line 109 is connected with the scanning signal driving circuit 103 at the end of the TFT array substrate 100. The source signal line 110 similarly extends from the display region 101 to the frame region 102. Then, the source signal line 110 is connected to the display signal driving circuit 104 at the end of the TFT array substrate 100. An external line 106 is connected near the scanning signal driving circuit 103. Further, an external line 107 is connected near the display signal driving circuit 104. The external lines 106 and 107 are constituted, for example, by a wiring board such as an FPC (Flexible Printed Circuit).

Various signals are externally supplied to the scanning signal driving circuit 103 and the display signal driving circuit 104 through the external lines 106 and 107. The scanning signal driving circuit 103 supplies a gate signal (scanning signal) to the gate signal line 109 in accordance with an external control signal. The gate signal lines 109 are successively selected in accordance with the gate signal. The display signal driving circuit 104 supplies a display signal (display voltage) to the source signal lines 110 in accordance with the external control signal or display data. As a result, the display voltage corresponding to the display data can be applied to each pixel 105. Incidentally, the scanning signal driving circuit 103 and the display signal driving circuit 104 are not limited to the above structure where the circuits are formed on the TFT array substrate 100. For example, driving circuits may be connected by a TCP (Tape Carrier Package).

The frame region 102 of the TFT array substrate 100 includes an auxiliary capacitance line 111 that functions as a common line. The auxiliary capacitance line 111 is arranged in parallel to the source signal line 110. The auxiliary capacitance electrode 4 extends from the display region 101 to the frame region 102. Then, the auxiliary capacitance electrode 4 is connected to the auxiliary capacitance line 111. Then, a common potential is supplied to the auxiliary capacitance electrode 4 through the auxiliary capacitance line 111.

In each pixel, at least one TFT 108 and an auxiliary capacitance (not shown) are formed. Then, in each pixel 105, the TFT 108 and the auxiliary capacitance are connected in series. The TFT 108 is arranged in the vicinity of an intersection of the source signal line 110 with the gate signal line 109. The auxiliary capacitance is structured by forming a dielectric insulating film between the electrodes that are opposedly arranged. In this example, the insulating film is formed between the pixel electrode and the auxiliary capacitance electrode 4 to which the common potential is supplied. Then, the voltage applied to the pixel electrode can be held for a certain period of time by the auxiliary capacitance. For example, the TFT 108 supplies a display voltage to the pixel electrode. The gate electrode of the TFT 108 as a switching element is connected to the gate signal line 109, and the TFT 108 is turned ON/OFF under control in accordance with a signal input from a gate terminal. The source electrode of the TFT 108 is connected to the source signal line 110. When a voltage is applied to the gate electrode, a current flows from the source signal line 110. Thus, a display voltage is applied from the source signal line 110 to the pixel electrode connected to the drain electrode of the TFT 108. Then, an electric field corresponding to the display voltage is generated between the pixel electrode and an opposing electrode.

An opposing substrate is arranged opposite to the TFT array substrate 100. The opposing substrate is, for example, a color filter substrate and is placed on the display screen side. On the opposing substrate, a color filter, a black matrix (BM), the opposing electrode, an orientation film and the like are formed. Incidentally, the opposing electrode is placed on the TFT array substrate 100 side, for example, in an IPS-type liquid crystal display device. Then, a liquid crystal layer is formed between the TFT array substrate 100 and the opposing substrate. That is, a liquid crystal is filled in between the TFT array substrate 100 and the opposing substrate. Further, a polarizing plate, a retardation plate and the like are placed on the outer surfaces of the TFT array substrate 100 and the opposing substrate. Further, a backlight unit or the like is arranged on the opposite side to the display screen of the liquid crystal panel.

A liquid crystal is driven by an electric field generated between the pixel electrode and the opposing electrode. That is, an orientation direction of the liquid crystal between the substrates is changed. As a result, a polarized state of light transmitted through the liquid crystal layer is changed. That is, a polarized state of the light that was turned into linearly-polarized light through the polarizing plate is changed by the liquid crystal layer. More specifically, light from a backlight unit and external light are turned into linearly-polarized light by the polarizing plate. Then, a polarized state is changed by the linearly-polarized light passing through the liquid crystal layer.

Accordingly, an amount of light transmitted through the polarizing plate on the opposing substrate side is changed in accordance with the polarized state. That is, an amount of light transmitted through the polarizing plate on the display screen side out of the light emitted from the backlight unit and transmitted through the liquid crystal panel is changed. The orientation direction of liquid crystal is changed in accordance with the applied display voltage. Hence, the display voltage is controlled to thereby change an amount of light transmitted through the polarizing plate on the display screen side. That is, different display voltages are applied to the pixels to thereby display a desired image.

Figure 2:
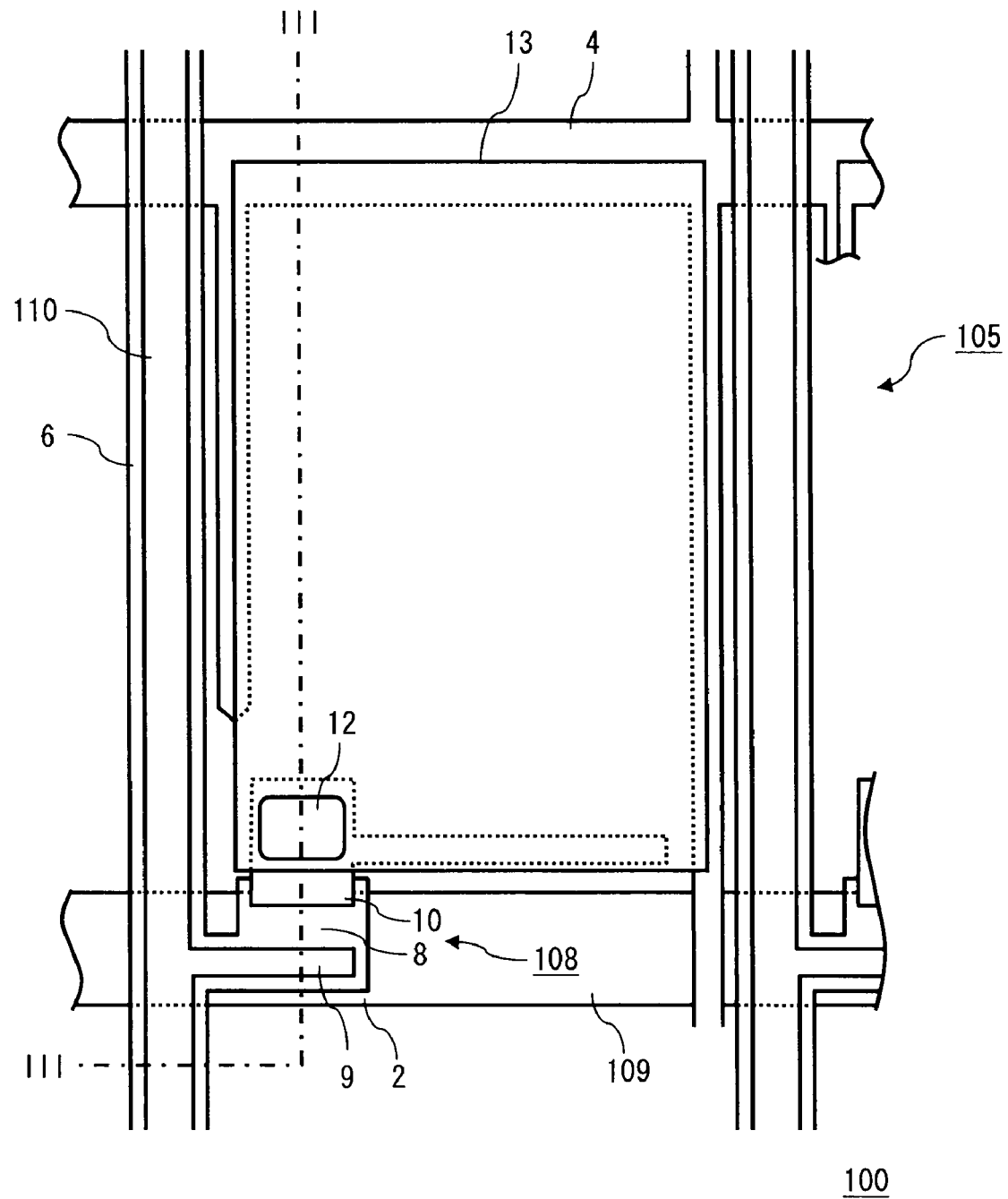
FIG. 2 is a top schematic view showing the structure of a pixel of the TFT array substrate according to the first embodiment.
Figure 3:
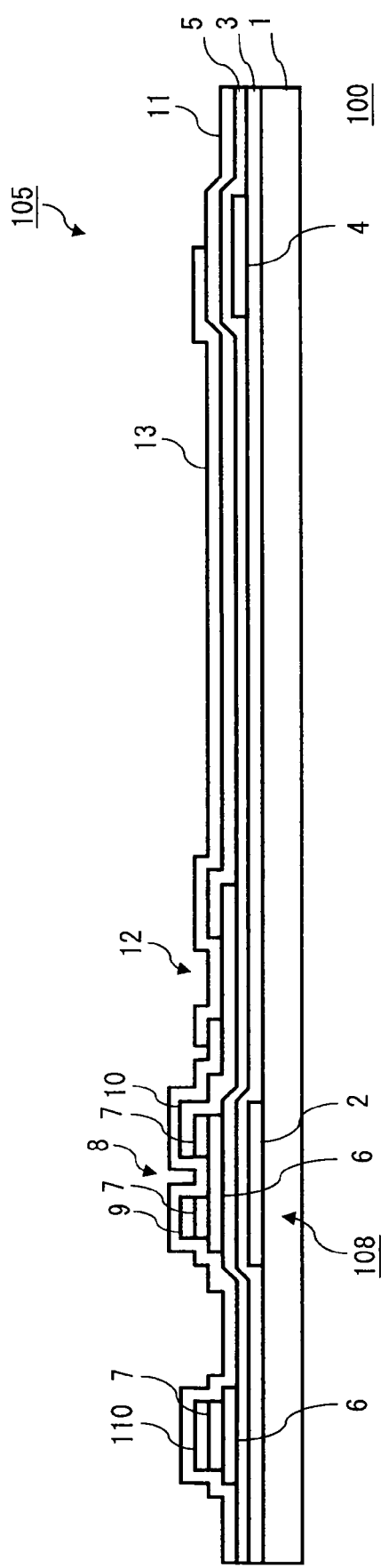
FIG. 3 is a cross sectional view taken along the line III-III of FIG. 2.

Next, the structure of the pixel 105 of the TFT array substrate 100 will be described with reference to FIGS. 2 and 3. FIG. 2 is a top schematic view showing the structure of the pixel 105 of the TFT array substrate 100. FIG. 3 is a cross sectional view taken along the line III-III of FIG. 2. On the TFT array substrate 100, the gate signal line 109, the source signal lines 110, and the auxiliary capacitance electrode 4 are formed to define each pixel 105. In FIG. 2, the gate signal line 109 is formed in a lateral direction, and the source signal lines 110 are formed in a longitudinal direction. Further, the auxiliary capacitance electrode 4 is formed in parallel with the gate signal line 109. In summary, a pixel electrode 13 is formed in a rectangular region surrounded by the gate signal line 109, the auxiliary capacitance electrode 4, and two source signal lines 110. This area is the pixel 105.

The gate signal line 109 and a gate electrode 2 are formed on a transparent insulating substrate 1 made of glass or the like. The gate signal line 109 includes the gate electrode 2. The gate signal line 109 extends across the plurality of pixels 105 and supplies the gate signals to the gate electrode 2 of each pixel 105. The gate signal line 109 and the gate electrode 2 are formed of a low-resistance metallic thin film. Then, a first insulating film 3 is formed as the first gate insulating film so as to cover the gate signal line 109, the gate electrode 2, and the auxiliary capacitance line 111.

On the first insulating film 3, the auxiliary capacitance electrode 4 is formed. When used in a transmissive liquid crystal display device, the auxiliary capacitance electrode 4 is formed of a transparent conductive film such as ITO (Indium Tin Oxide), for example. The auxiliary capacitance electrode 4 extends along with the gate signal line 109. In summary, the auxiliary capacitance electrode 4 is formed across the plurality of pixels 105. Further, the auxiliary capacitance electrode 4 is electrically connected to the auxiliary capacitance line 111 at external part of the display region. Then, the common potential is supplied from the auxiliary capacitance line 111 to the auxiliary capacitance electrode 4 formed in each of the pixels 105. The auxiliary capacitance line 111 is formed in the same layer and by the same material as the gate electrode 2 and the gate signal line 109.

Further, a part of the auxiliary capacitance electrode 4 extends along with the source signal line 110 arranged so as to be orthogonal to the gate signal line 109. In the side opposite to the TFT 108 of the source signal line 110, the auxiliary capacitance electrode 4 extends along with the plurality of pixels 105. In summary, in FIG. 2, in the left side of the source signal line 110, the auxiliary capacitance electrode 4 is formed to traverse the gate signal line 109. In other words, the auxiliary capacitance electrode 4 is formed in a lattice shape. Thus, the auxiliary capacitance electrode 4 crosses the gate signal line 109. In the TFT 108 side of the source signal line 110, the auxiliary capacitance electrode 4 extends to substantially the center of the pixel 105. In summary, in FIG. 2, in the right side of the source signal line 110, the auxiliary capacitance electrode 4 extends to substantially the center of the pixel 105. As such, a part of the auxiliary capacitance electrode 4 extends downwardly from a part of the auxiliary capacitance electrode 4 that is formed in parallel with the gate signal line 109.

The auxiliary capacitance electrode 4 is formed of transparent conductive film typically having a higher resistance than the metallic thin film, as stated above. Further, by forming the auxiliary capacitance electrode 4 in a lattice shape by crossing it with the gate signal line 109, the voltage can be supplied to the auxiliary capacitance electrode 4 from four points. More specifically, it is possible to supply voltage to the auxiliary capacitance electrode 4 of each pixel 105 from four sides of the rectangular pixel 105. Thus, the resistance of the auxiliary capacitance electrode 4 can be made lower.

Furthermore, for example, the width of the auxiliary capacitance electrode 4 which extends along with the source signal line 110 may be narrower than the width of the auxiliary capacitance electrode 4 which extends along with the gate signal line 109. More specifically, a part of the auxiliary capacitance electrode 4 is auxiliarily formed in order to decrease the resistance of the auxiliary capacitance electrode 4. Then, this part of the auxiliary capacitance electrodes 4 which is auxiliarily formed may be made narrower. Note that the width of the auxiliary capacitance electrode 4 which extends along with the gate signal line 109 may be made relatively narrower than the width of the gate signal line 109. Accordingly, the intersection of the auxiliary capacitance electrode 4 with the gate signal line 109 can be made small. Then, the parasitic capacity generated by this intersection can be reduced. Thus, the delay of the gate signal reduces. As a matter of course, the intersection of the auxiliary capacitance electrode 4 with the source signal line 110 is small as well, whereby the delay of the source signal decreases as well.

When it is desired to further reduce the resistance of the auxiliary capacitance electrode 4, a part of the auxiliary capacitance electrode 4 may be extended along with the gate signal line 109. For example, a part of the auxiliary capacitance electrode 4 may be extended along with the gate signal line 109 in the central part of the pixel 105. Thus, the auxiliary capacitance electrode 4 crosses the source signal line 110, and the resistance of the auxiliary capacitance electrode 4 can be made lower.

A second insulating film 5 is formed as a second gate insulating film so as to cover the auxiliary capacitance electrode 4. Then, a semiconductor active film 6 is formed on the second insulating film 5. The semiconductor active film 6 is opposed to the gate electrode 2 with the first insulating film 3 and the second insulating film 5 interposed therebetween.

Further, the semiconductor active film 6 is formed below the source signal line 110 as well. The semiconductor active film 6 is patterned to be larger than the source signal line 110. Further, an ohmic contact film 7 is formed on the semiconductor active film 6. The ohmic contact film 7 is a semiconductor active film including an impurity element, and has conductivity. As such, the semiconductor active film 6 and the ohmic contact film 7 are formed below the source signal line 110. Thus, a step of the pattern of the gate signal line 109 is reduced by patterns of the semiconductor active film 6 and the ohmic contact film 7. Thus, it is possible to prevent the source signal line 110 from being disconnected at the step section. The ohmic contact film 7 is formed to be smaller than the semiconductor active film 6. Above the gate electrode 2, the ohmic contact film 7 is formed on both ends of the semiconductor active film 6. In summary, above the gate electrode 2, the ohmic contact film 7 is not formed on the center of the semiconductor active film 6. The part where the ohmic contact film 7 is not formed is a channel portion 8.

On the ohmic contact film 7, the source signal line 110, a source electrode 9, and a drain electrode 10 are formed. Above the gate electrode 2, the ohmic contact film 7 is formed on both ends of the semiconductor active film 6 as described above. The drain electrode 10 is formed on the ohmic contact film 7 in the auxiliary capacitance electrode 4 side. The source electrode 9 is formed on the ohmic contact film 7 in the gate signal line 109 side. In summary, the source electrode 9 and the drain electrode 10 are formed with the channel portion 8 therebetween. The source signal line 110 includes the source electrode 9. The source signal line 110 extends across the plurality of pixels 105, and supplies the source signal to the source electrode 9 of each pixel 105. The source signal line 110 including the source electrode 9 and the ohmic contact film 7 formed therebelow have substantially the same size. The drain electrode 10 is formed so as to extend beyond the pattern of the ohmic contact film 7 formed therebelow. Further, a part of the drain electrode 10 extends along with the gate signal line 109.

A third insulating film 11 is formed to cover them as a passivation film. In the third insulating film 11 on the drain electrode 10, a pixel contact hole 12 is formed. In other words, the third insulating film 11 is not formed in a part on the drain electrode 10. Then, the pixel electrode 13 is formed in substantially the whole area of the pixel part. In summary, the pixel electrode 13 is formed in a region surrounded by the adjacent gate signal line 109 and the auxiliary capacitance electrode 4, and the adjacent source signal lines 110. Then, the pixel electrode 13 overlaps with at least a part of the auxiliary capacitance electrode 4 and the drain electrode 10. In summary, the pixel electrode 13 overlaps with the auxiliary capacitance electrode 4 in the lower layer with the second insulating film 5 and the third insulating film 11 therebetween. Thus, charge is stored between the auxiliary capacitance electrode 4 and the pixel electrode 13. Then, the auxiliary capacitance electrode 4 forms the auxiliary capacitance for holding the voltage applied to the pixel electrode 13 for a certain period of time. The pixel electrode 13 is buried in the contact hole 12. Then, the pixel electrode 13 and the drain electrode 10 are connected through the contact hole 12.

Figure 4:
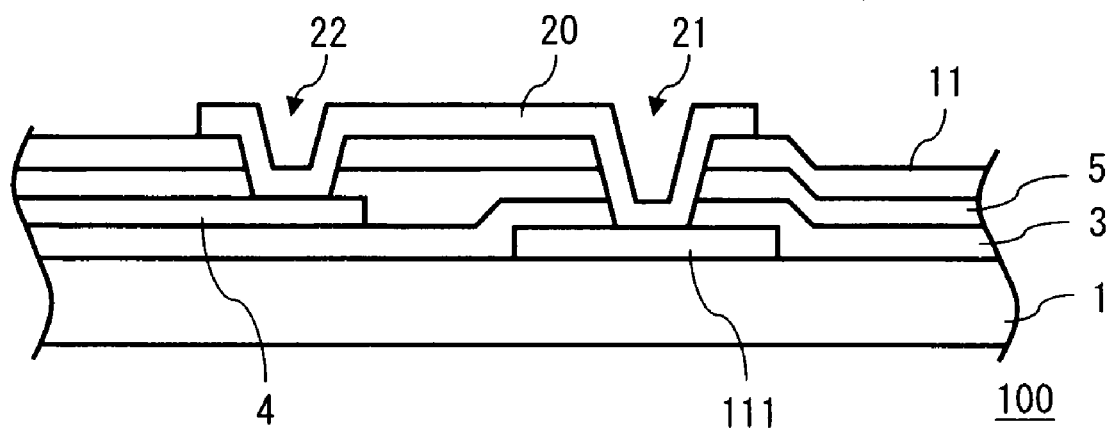
FIG. 4 is a cross sectional view schematically showing the structure of a connection part connecting an auxiliary capacitance electrode and an auxiliary capacitance line according to the first embodiment.

Next, a connection part connecting the auxiliary capacitance electrode 4 and the auxiliary capacitance line 111 will be described with reference to FIG. 4. FIG. 4 is a cross sectional view schematically showing the structure of the connection part connecting the auxiliary capacitance electrode 4 and the auxiliary capacitance line 111. This connection part is formed in the frame region 102 shown in FIG. 1.

As stated above, the auxiliary capacitance line 111 is formed in the same layer as the gate electrode 2 and the gate signal line 109. Further, the auxiliary capacitance electrode 4 is formed on the first insulating film 3. In summary, the auxiliary capacitance line 111 and the auxiliary capacitance electrode 4 are formed in different layers. They are electrically connected by a bridge electrode 20 formed in the upper layer. The bridge electrode 20 is formed on the third insulating film 11. In summary, the bridge electrode 20 is formed in the same layer as the pixel electrode 13 and by the same material as the pixel electrode 13.

More specifically, a Cs terminal part contact hole 21 is formed in the first insulating film 3, the second insulating film 5, and the third insulating film 11 above the auxiliary capacitance line 111. Then, a Cs electrode part contact hole 22 is formed in the second insulating film 5 and the third insulating film 11 above the auxiliary capacitance electrode 4. The bridge electrode 20 is buried in the contact holes 21 and 22. Then, the bridge electrode 20 is connected to the auxiliary capacitance line 111 in the Cs terminal part contact hole 21. Further, the bridge electrode 20 is connected to the auxiliary capacitance electrode 4 in the Cs electrode part contact hole 22. Thus, the auxiliary capacitance line 111 and the auxiliary capacitance electrode 4 are electrically connected through the bridge electrode 20.

The structure of the connection part is not limited to the above structure. For example, apart of the auxiliary capacitance electrode 4 and the auxiliary capacitance line 111 overlap with each other. Then, the contact hole is formed in the first insulating film 3. It is also possible to connect the auxiliary capacitance electrode 4 and the auxiliary capacitance line 111 by burying the auxiliary capacitance electrode 4 in the contact hole. Further, the auxiliary capacitance electrode 4 and the auxiliary capacitance line 111 may be formed in the same layer and by the same material. In summary, the auxiliary capacitance electrode 4 and the auxiliary capacitance line 111 may be integrally formed. However, it is preferable to employ the structure as above when the transparent conductive film having high resistance is employed as the auxiliary capacitance electrode 4. In summary, it is preferable to form the auxiliary capacitance electrode 4 and the auxiliary capacitance line 111 in different layers and by different materials. Then, the auxiliary capacitance line 111 is formed in the layer where the metal line and the metal electrode are formed, for example, in the same layer as the gate signal line 109. As such, it is preferable to form the auxiliary capacitance line ill by the metal having lower resistance compared with the transparent conductive film.

The TFT array substrate 100 according to the present embodiment is formed as described above. In the TFT array substrate 100 of the above description, the auxiliary capacitance electrode 4 is formed in a different layer as the gate signal line 109 and the source signal line 110. Thus, it is possible to suppress the short defect caused by connecting the auxiliary capacitance electrode 4 and the gate signal line 109, or the auxiliary capacitance electrode 4 and the source signal line 110. Further, it is possible to form the auxiliary capacitance electrode 4 in a desired shape without complicating the configuration. For example, assume a case that the auxiliary capacitance electrode 4 and the source signal line 110 are formed in the same layer. In this case, in a position where the source signal line 110 crosses the auxiliary capacitance electrode 4, the source signal line 110 contacts the auxiliary capacitance electrode 4 and short-circuit occurs. Accordingly, in this position, the auxiliary capacitance electrode 4 needs to be divided and connected by a bridge electrode in the upper layer, for example. By having the configuration as in the first embodiment, the complicated configuration as above is not needed.

Furthermore, when the structure of the first embodiment is applied to the transmissive liquid crystal display device, the auxiliary capacitance electrode 4 is formed by the transparent conductive film. Thus, even in the region where the auxiliary capacitance electrode 4 is formed, the light emitted from the backlight unit of the liquid crystal display device is transmitted, for example. As such, the area where the light is transmitted increases, and the aperture ratio can be increased. As such, according to the first embodiment of the present invention, the TFT array substrate 100 having excellent property can be obtained.

Next, a manufacturing method of the TFT array substrate 100 will be described with reference to FIGS. 5A to 5F, FIGS. 6A to 6F, and FIGS. 7A to 7E. FIGS. 5A to 5F are top schematic views showing the structure of the pixel 105 in the manufacturing process of the TFT array substrate 100. FIGS. 6A to 6F are cross sectional views schematically showing the structure of the pixel 105 in the manufacturing process of the TFT array substrate 100. FIGS. 7A to 7E are cross sectional views schematically showing the structure of the connection part connecting the auxiliary capacitance line 111 and the auxiliary capacitance electrode 4 in the manufacturing process of the TFT array substrate 100.

The insulating substrate 1 is cleaned to purify the surface. In this example, a glass substrate having a thickness of 0.7 mm is employed as the insulating substrate 1. When used in the transmissive liquid crystal display device, a transparent insulating substrate such as a glass substrate is employed. When used in the reflective liquid crystal display device, the insulating substrate having insulation property of about glass substrate can be employed. In this case, the insulating substrate which does not have transparency can be employed as well. Further, the thickness of the insulating substrate 1 may be any suitable one.

Then, the gate electrode 2, the gate signal line 109, and the auxiliary capacitance line 111 are formed on the insulating substrate 1. First, a first metallic thin film is formed on the insulating substrate 1 by a sputtering method or the like. The first metallic thin film may be formed of at least one of chromium, molybdenum, tantalum, titanium, aluminum, and copper, for example, or may be alloy obtained by adding a small amount of other substances to at least one of these metal simple substances. Further, the first metallic thin film may be a thin film having a thickness of about 100 nm to 500 nm, for example. The contact hole is formed on the first metallic thin film by a dry etching at a process that will be described later. Thus, the first metallic thin film is preferably a metallic thin film which rarely causes surface oxidation or a metallic thin film having conductivity even after the oxidation. The metallic thin film preferably has at least a surface covered with chromium, titanium, tantalum, or molybdenum. Further, the first metallic thin film may include different types of metallic thin films stacked therein or may have different compositions in the film-thickness direction.

Figure 5A:
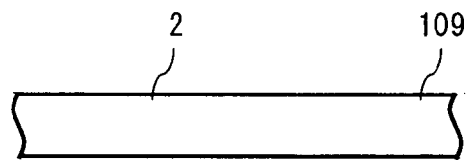
Figure 5B:
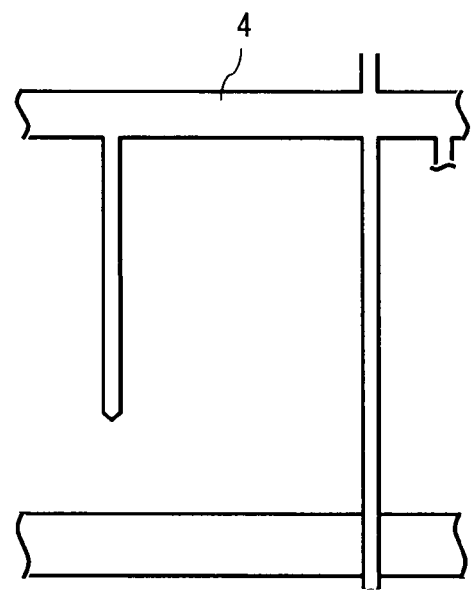
Figure 5C:
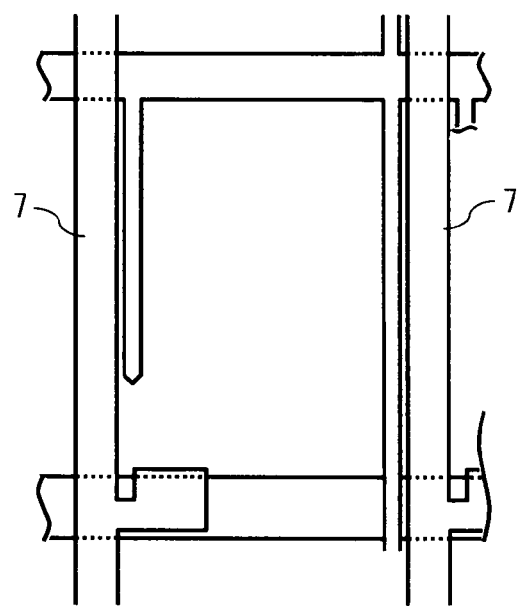
Figure 6A:
FIGS. 6A to 6F are cross sectional views schematically showing the structure of the pixel in the manufacturing process of the TFT array substrate according to the first embodiment.
Figure 6B:
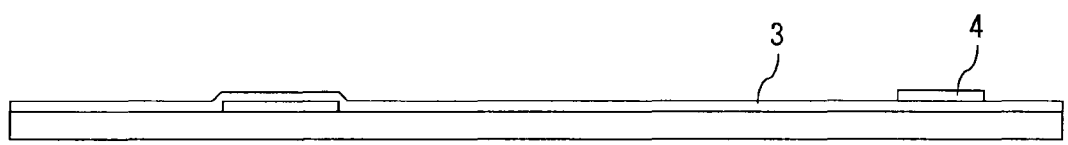
Figure 6C:
Figure 6D:
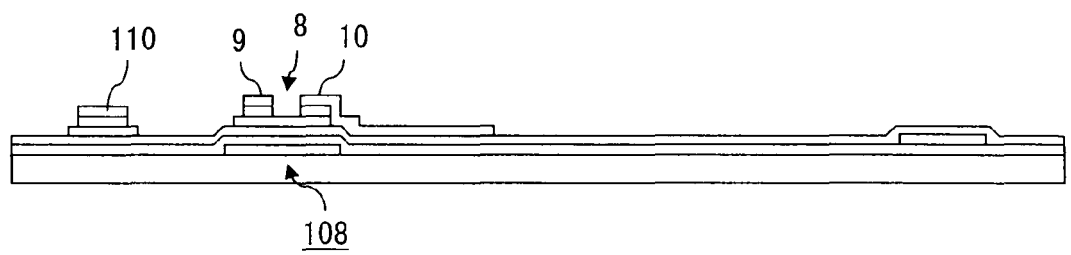
Figure 6E:
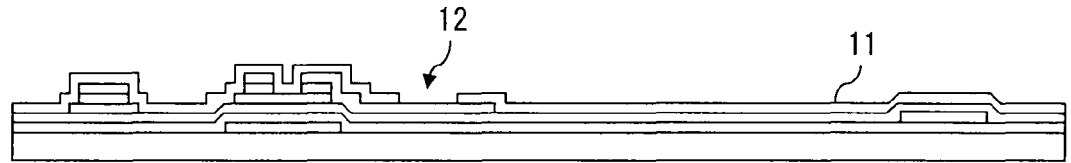
Figure 6F:
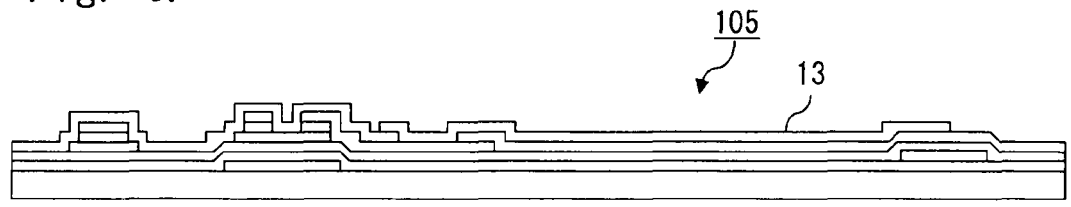
Figure 7A:
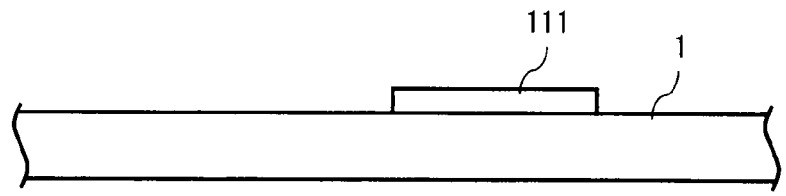
FIGS. 7A to 7E are cross sectional views schematically showing the structure of the connection part connecting the auxiliary capacitance line and the auxiliary capacitance electrode in the manufacturing process of the TFT array substrate according to the first embodiment.
Figure 7B:
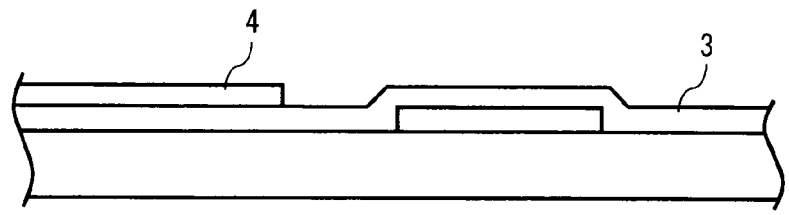
Figure 7C:
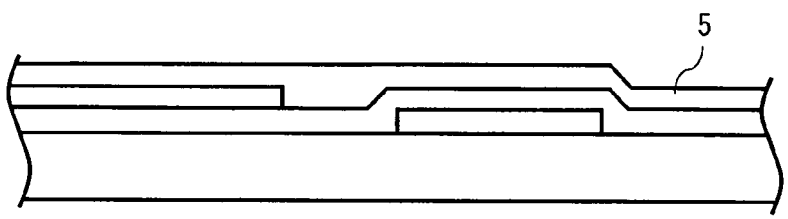
Figure 7D:
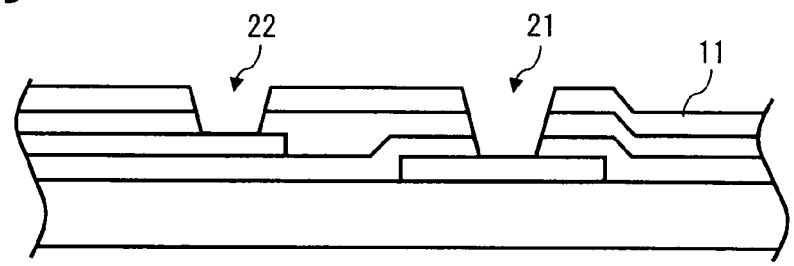
Figure 7E:
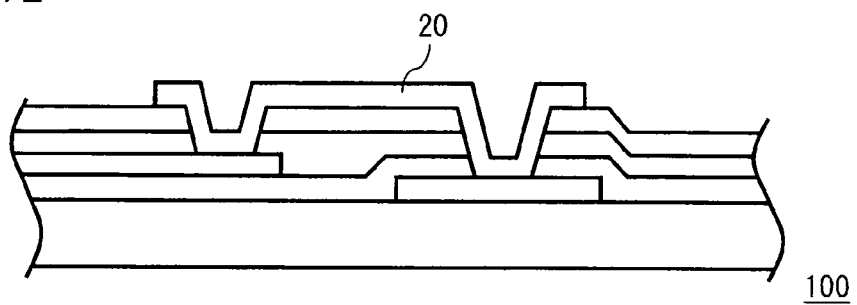

Then, a first photolithography process of applying a photo resist which is a photosensitive resin on the first metallic thin film by spin coat, and exposing and developing the applied photo resist is carried out. Thus, the photo resist is patterned in a desired pattern. After that, the first metallic thin film is etched and patterned. Then the photo resist pattern is removed. Thus, the gate electrode 2, the gate signal line 109, and the auxiliary capacitance line 111 are formed. According to the above process, the structures shown in FIGS. 5A, 6A, and 7A are obtained.

Next, the first insulating film 3 is formed by plasma CVD method. The first insulating film 3 may be $SiN_x$ film, $SiO_y$ film, $SiO_zN_w$ film (x, y, z, and w are positive numbers) or a stacked film thereof. The first insulating film 3 has a film thickness of about 100 nm to 300 nm. When the film thickness is small, short-circuit easily occurs at the intersection of the gate signal line 109 with the source signal line 110. When the film thickness is large, the ON current of the TFT 108 becomes small and the display characteristics are degraded. Accordingly, it is preferable for the first insulating film 3 to have the above film thickness.

Next, a conductive thin film which will be the auxiliary capacitance electrode 4 is formed on the first insulating film 3 by sputtering method or the like. When used in the transmissive liquid crystal display device, the conductive thin film may be ITO (Indium Tin Oxide), IZO or the like which is a transparent conductive film. When used in the transmissive liquid crystal display device, the film thickness of the transparent conductive film is about 40 nm to 200 nm. The thickness of the transparent conductive film in the transmissive liquid crystal display device is selected from a range of about 50 nm to 200 nm including the opposing substrate so as not to cause coloring due to interference when the light transmits. When the film thickness is small, desired resistance cannot be obtained, and the display characteristics are not satisfactory. On the other hand, when the film thickness is large, the step shape due to the auxiliary capacitance electrode 4 causes distortion when the source signal line 110 overlaps the auxiliary capacitance electrode 4. Thus, the auxiliary capacitance electrode 4 and the source signal line 110 may be short-circuited. Accordingly, the thickness of the transparent conductive thin film is preferably in the above range.

Next, the transparent conductive film is patterned by a second photolithography process. Thus, the auxiliary capacitance electrodes 4 is formed. At this time, the auxiliary capacitance electrode 4 is formed to cross the gate signal line 109 because the transparent conductive film generally has a higher resistance than the metallic thin film. Accordingly, the resistance of the auxiliary capacitance electrode 4 can be made lower. Further, when it is desired to make resistance further lower, the auxiliary capacitance electrode 4 may be formed to cross the source signal line 110. Thus, the structures shown in FIGS. 5B, 6B, and 7B can be obtained.

Next, the second insulating film 5, the semiconductor active film 6, and the ohmic contact film 7 are successively formed above the insulating substrate 1 by plasma CVD method. The second insulating film 5 may be $SiN_x$ film, $SiO_y$ film, $SiO_zN_w$ film (x, y, z, and w are positive numbers) or a stacked film thereof. The second insulating film 5 has a film thickness of about 100 nm to 300 nm, due to the same reason as in the first insulating film 3. The semiconductor active film 6 may be amorphous silicon (a-Si) film or polysilicon (p-Si) film. The film thickness of the semiconductor active film 6 is about 100 nm to 300 nm. When the film thickness is small, the semiconductor active film 6 in the lower layer of the ohmic contact film 7 disappears when the ohmic contact film 7 is subjected to dry etching as described below. When the film thickness is large, the ON current of the TFT 108 decreases. To that end, the film thickness of the semiconductor active film 6 is selected by the ON current of the TFT which requires controllability of etching depth when the ohmic contact film 7 is subjected to dry etching. When the a-Si film is employed as the semiconductor active film 6, the surface of the second insulating film 5 contacting with the a-Si film is preferably $SiN_x$ film or $SiO_zN_w$ film. Accordingly, the controllability of the threshold voltage (Vth) of the TFT 108 is improved, and the reliability is enhanced as well.

As an example, the ohmic contact film 7 is n$^+$a-Si film or n$^+$p-Si film obtained by doping a small amount of phosphorus in the a-Si film or p-Si film. The film thickness of the ohmic contact film 7 may be from 20 nm to 70 nm. These SiN$_x$ film, SiO$_y$ film, SiO$_z$N$_w$ film, a-Si film, p-Si film, n$^+$a-Si film, and n$^+$p-Si film may be formed by using a known gas (for example, SiH$_4$, NH$_3$, H$_2$, NO$_2$, PH$_3$, and N$_2$, or mixed gas thereof).

Next, the semiconductor active film 6 and the ohmic contact film 7 are patterned by a third photolithography process. Thus, the semiconductor active film 6 and the ohmic contact film 7 are formed in a part where the TFT 108 of the display pixel is formed (hereinafter referred to as TFT part) and in a part where the source signal line 110 is formed (hereinafter referred to as source signal line part). Further, in the connection part of the auxiliary capacitance line 111 and the auxiliary capacitance electrode 4, the semiconductor active film 6 and the ohmic contact film 7 are completely removed. Further, the semiconductor active film 6 and the ohmic contact film 7 are formed in a larger pattern than the TFT part and the source signal line part and in a continuous shape. In this example, the semiconductor active film 6 and the ohmic contact film 7 are formed to have the same shape. The etching of the semiconductor active film 6 and the ohmic contact film 7 is carried out by dry etching using a known gas (mixed gas of SF$_6$ and O$_2$ or mixed gas of CF$_4$ and O$_2$, for example). According to the above process, the structures shown in FIGS. 5C, 6C, and 7C can be obtained.

Next, a second metallic thin film is formed all over the insulating substrate 1 by the sputtering method, for example. The second metallic thin film may be formed of at least one of chromium, molybdenum, tantalum, titanium, aluminum, and copper, for example, or may be alloy obtained by adding a small amount of other substances to at least one of these metal simple substances. Further, the second metallic thin film may be a thin film having a thickness of about 100 nm to 500 nm, for example. The contact hole is formed on the second metallic thin film by a dry etching at a process that will be described later, as is similar to the first metallic thin film. Further, the conductive thin film is formed on the second metallic thin film. Thus, the second metallic thin film is preferably a metallic thin film which rarely causes surface oxidation or a metallic thin film having conductivity even after the oxidation.

Then, the second metallic thin film is patterned by a fourth photolithography process. Thus, the source signal line 110, the source electrode 9, and the drain electrode 10 of the TFT 108 are formed. Then, the ohmic contact film 7 is etched using patterns of the source signal line 110, the source electrode 9, and the drain electrode 10 as a mask. Accordingly, a part of the ohmic contact film 7 which is out of the source signal line 110, the source electrode 9, and the drain electrode 10 is removed by etching. Then, the central part of the ohmic contact film 7 above the gate electrode 2 is removed to expose the semiconductor active film 6. Thus, the ohmic contact film 7 which is between the source electrode 9 and the drain electrode 10 is removed to form the channel portion 8 of the pixel part. In the connection part of the auxiliary capacitance line 111 with the auxiliary capacitance electrode 4, the second metallic thin film is completely removed.

The second metallic thin film is subjected to wet etching using a known etchant. For example, when the second metallic thin film is formed of chromium, the wet etching is carried out using aqueous solution in which cerium diammonium nitrate and nitric acid are mixed therein. Further, the second metallic thin film is preferably etched so that the pattern edge has a tapered shape. Thus, it is possible to suppress the disconnection of the electrode pattern formed of the conductive thin film formed in the upper layer. The etching of the ohmic contact film 7 is carried out by dry etching using a known gas (for example, mixed gas of SF$_6$ and O$_2$ or mixed gas of CF$_4$ and O$_2$). The etching of the ohmic contact film 7 is controlled so that at least the ohmic contact film 7 is removed and the semiconductor active film 6 in the lower layer thereof does not disappear. The semiconductor active film 6 in the lower layer preferably remains to have large thickness. Thus, the TFT 108 having large mobility can be obtained. From the above process, the structures shown in FIGS. 5D and 6D can be obtained.

Next, the third insulating film 11 which will be a passivation film is formed by the plasma CVD method or the like. The third insulating film 11 may be SiN$_x$ film, SiO$_y$ film, or SiO$_z$N$_w$ film. The film thickness of the third insulating film 11 is about 200 nm or more. When the film thickness of the third insulating film 11 is too large, the photo resist may disappear in dry etching when the contact hole is formed as below. Accordingly, the film thickness of the third insulating film 11 is selected by selectivity of the second insulating film 5 and the photo resist when the contact hole is subjected to the dry etching. Further, when the film thickness of the third insulating film 11 is too large, there is caused cutout of step in the electrode made of the conductive thin film formed on the contact hole. Accordingly, the upper limit of the film thickness of the third insulating film 11 is determined by a step coverage of the conductive thin film. The step coverage means the condition of the film applied to a small step portion on the surface. As stated above, the film thickness is preferably about 200 nm to 600 nm from a point of productivity, step coverage of the conductive thin film, and selectivity of the combination of photo resist and the dry etching for forming the contact hole in the second insulating film 5.

Then, the first insulating film 3, the second insulating film 5, and the third insulating film 11 are patterned by a fifth photolithography process to form the contact hole. The contact hole which is formed here includes a first contact hole, a second contact hole, and a third contact hole. In the first contact hole, the first insulating film 3, the second insulating film 5, and the third insulating film 11 above the first metallic thin film are removed. Thus, the first metallic thin film is exposed. The first contact hole is, for example, the Cs terminal part contact hole 21 penetrating to the surface of the auxiliary capacitance line 111. Further, a contact hole of a portion where a transfer terminal is formed (hereinafter referred to as transfer terminal portion) is also formed, for example. This transfer terminal portion is formed to electrically connect the opposing substrate and the TFT array substrate 100 when the opposing substrate includes the opposing electrode. The connection is often performed by having a resin including conductive particles interposed therebetween.

In the second contact hole, the third insulating film 11 above the second metallic thin film is removed. Thus, the second metallic thin film is exposed. The second contact hole is, for example, a pixel contact hole 12 penetrating to the surface of the drain electrode 10. In the third contact hole, the second insulating film 5 and the third insulating film 11 above the auxiliary capacitance electrode 4 are removed. Thus, the auxiliary capacitance electrode 4 is exposed. The third contact hole is the Cs electrode part contact hole 22 penetrating to the surface of the auxiliary capacitance electrode 4. Thus, various contact holes, each of which being needed to manufacture the TFT array substrate 100, are formed. The first insulating film 3, the second insulating film 5, and the third insulating film 11 are subjected to the dry etching using a known gas (for example, mixed gas of SF$_6$ and O$_2$ or mixed gas of $CF_4$ and $O_2$). From the above process, the structures shown in FIGS. 5E, 6E, and 7D can be obtained.

Next, a conductive thin film which will be the pixel electrode 13 and the bridge electrode 20 is formed on the third insulating film 11 by the sputtering method or the like. Further, the conductive thin film is embedded in the pixel contact hole 12, the Cs terminal part contact hole 21, and the Cs electrode part contact hole 22. When used in the transmissive liquid crystal display device, the conductive thin film may be ITO (Indium Tin Oxide), $SnO_2$ or the like that is a transparent conductive film. Among them, ITO is especially preferred from a point of chemical stability. When used in the reflective liquid crystal display device, the conductive thin film may be any one as long as the sheet resistance is about 500 $\Omega/\square$ or less and it does not cause degradation of the liquid crystal material by reaction with the liquid crystal material. Accordingly, in this case, the conductive thin film which does not have transparency may also be used. When used in the transmissive liquid crystal display device, the film thickness of the conductive thin film may be about from 50 nm to 200 nm. When used in the reflective liquid crystal display device, the film thickness of the conductive thin film may be about from 50 nm to 500 nm. When used in the transmissive liquid crystal display device, the thickness of the transparent conductive film is selected from a range of about 50 nm to 200 nm including the opposing substrate so that the coloring due to the interference when the light transmits does not occur.

Next, the conductive thin film is patterned by a sixth photolithography process. Accordingly, the pixel electrode 13 and the bridge electrode 20 are formed. Then, the drain electrode 10 and the pixel electrode 13 are electrically connected by the pixel contact hole 12. Further, the bridge electrode 20 is embedded in the Cs terminal part contact hole 21 and the Cs electrode part contact hole 22 so that the auxiliary capacitance line 111 and the auxiliary capacitance electrode 4 are electrically connected. The conductive thin film is subjected to the wet etching or the like, the method thereof being known according to the material to be used. For example, when the conductive thin film is ITO, the wet etching is performed using the aqueous solution including hydrochloric acid and nitric acid. Further, when the conductive thin film is ITO, it is also possible to perform dry etching using a known gas ($CH_4$, for example). Although the pixel electrode 13 and the bridge electrode 20 are formed in this process, as described above, other electrodes may be formed in this process. For example, an electrode formed of the conductive thin film is formed in the transfer terminal portion. From the above-described process, the structures shown in FIGS. 5F, 6F, and 7E can be obtained.

As described above, the TFT array substrate 100 according to the first embodiment is manufactured by six photolithography processes. Further, the auxiliary capacitance electrode 4 and the auxiliary capacitance line 111 are formed in different layers. Thus, the short defect due to the connection of the auxiliary capacitance electrode 4 with the gate signal line 109 can be suppressed. Further, in case of the transmissive liquid crystal display device, the auxiliary capacitance electrode 4 is formed by the transparent conductive film. Thus, even in a region where the auxiliary capacitance electrode 4 is formed, the light from the backlight unit of the liquid crystal display device transmits, for example. Thus, the region where the light transmits increases, which makes it possible to increase the aperture ratio.

Furthermore, as described above, the auxiliary capacitance electrode 4 formed of the transparent conductive film and the auxiliary capacitance line 111 formed of the metallic thin film are formed in different layers. Accordingly, it is possible to suppress the corrosion of the transparent conductive film such as ITO. For example, assume a case that ITO is employed as the auxiliary capacitance electrode 4, and the Al-based material is employed as the auxiliary capacitance line 111. When the auxiliary capacitance electrode 4 and the auxiliary capacitance line 111 are formed in the same layer, the auxiliary capacitance electrode 4 is formed first. Then, the auxiliary capacitance line 111 is formed by the photolithography method with keeping the contact with the auxiliary capacitance electrode 4. Then, ITO forming the auxiliary capacitance electrode 4 and Al forming the auxiliary capacitance line 111 cause cell reaction by a developer used in the photolithography method. Thus, ITO is subjected to reductive corrosion. On the other hand, the above problem can be suppressed by forming them in the separate layers as in the first embodiment. The auxiliary capacitance line 111, the gate signal line 109, the gate electrode 2 and the like can be formed Al simple substance without using Al alloy.

Furthermore, as described above, the auxiliary capacitance electrode 4 formed of the transparent conductive film and the source/drain electrodes are formed in different layers. Thus, the transparent conductive film is not formed in the layer of the source/drain electrodes. Thus, it is possible to perform hydrogen plasma treatment in forming the third insulating film 11. This hydrogen plasma treatment is a method for stabilizing the off characteristics of the TFT 108. However, when the hydrogen plasma treatment is performed on the transparent conductive film such as ITO, for example, ITO is reduced, and the transparency is degraded. The same problem is caused when the auxiliary capacitance electrode 4 formed of the transparent conductive film is in the same layer as the source/drain electrodes. In the first embodiment, the auxiliary capacitance electrode 4 is formed in the different layer from the layer where the source/drain electrodes are formed, as described above. Thus, there is caused no problem as described above, and the characteristics of the TFT 108 can be improved. Further, no etching residue of the transparent conductive film is applied to the channel portion 8 between the source/drain electrodes. Thus, the reliability of the TFT 108 is enhanced. As described above, according to the first embodiment, it is possible to obtain the TFT array substrate 100 having excellent characteristics.

Second Embodiment

In the second embodiment, an active matrix substrate (TFT array substrate 100) used in a fringe-field (FFS)-driven liquid crystal display device will be described. More specifically, the shape of the auxiliary capacitance electrode 4 and the pixel electrode 13 is different from that of the first embodiment. The other structure, the manufacturing method and the like are the same as those in the first embodiment; and therefore, the overlapping description will be omitted.

Figure 8:
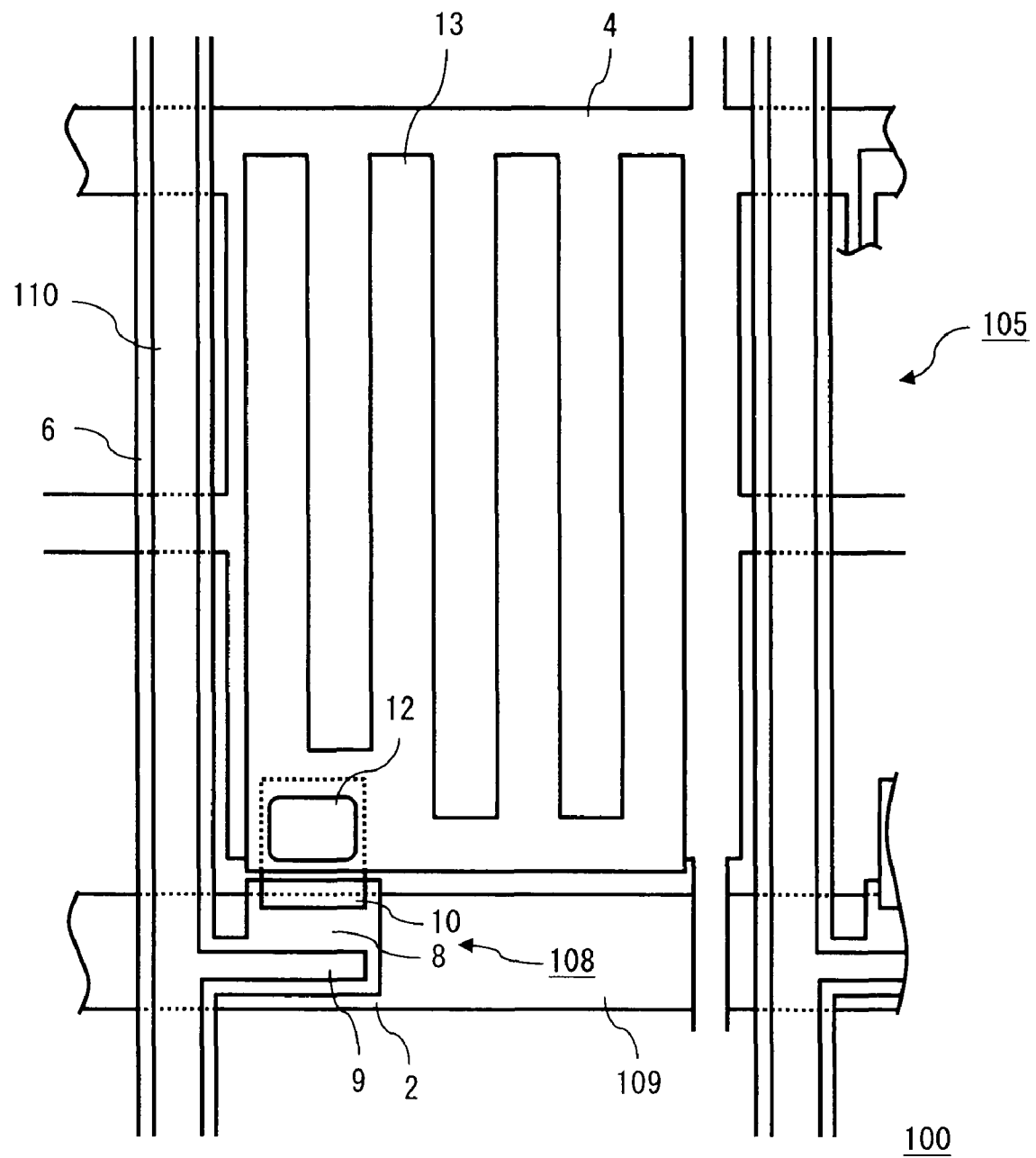
FIG. 8 is a top schematic view showing the structure of a pixel of a TFT array substrate according to a second embodiment.

First, the TFT array substrate 100 according to the second embodiment will be described with reference to FIG. 8. FIG. 8 is a top schematic view showing the structure of the pixel 105 of the TFT array substrate 100.

In the TFT array substrate 100 according to the second embodiment, the auxiliary capacitance electrode 4 is formed at substantially the whole area of the pixel part. In this example, the auxiliary capacitance electrode 4 functions as the opposing electrode. In summary, the opposing electrode is not formed in the opposing substrate. As is the same as the first embodiment, the auxiliary capacitance electrode 4 extends along with the gate signal line 109 at the end side of the pixel 105. Then, a part of the auxiliary capacitance electrode 4 extends along with the source signal line 110. Further, in the second embodiment, a part of the auxiliary capacitance electrode 4 extends along with the gate signal line 109 at substantially the center of the pixel 105. In summary, the auxiliary capacitance electrode 4 crosses the source signal line 110. In the example shown in FIG. 8, there are four intersections of the auxiliary capacitance electrode 4 with the source signal line 110. Specifically, in one pixel, the auxiliary capacitance electrode 4 traverses the source signal line 110 at two points in one side. As such, the auxiliary capacitance electrodes 4 of the pixels 105 that are adjacent in the extending direction of the gate signal line 109 are connected at two points. As there are many intersections as above, the resistance of the auxiliary capacitance electrode 4 can be made further lower. Furthermore, a part of the auxiliary capacitance electrode 4 which is auxiliarily formed in order to reduce the resistance of the auxiliary capacitance electrode 4 may be made smaller as is similar to the first embodiment. For example, in FIG. 8, the auxiliary capacitance electrode 4 crosses the source signal line 110 substantially at the central part of the pixel 105. The intersection becomes smaller by decreasing a part of the auxiliary capacitance electrode 4 auxiliarily formed, whereby it is possible to reduce parasitic capacity generated by the intersections.

The pixel electrode 13 is formed in a comb-tooth shape. More specifically, the pixel electrode 13 includes four comb-tooth electrodes formed along with the source signal line 110. Further, the four comb-tooth electrodes are formed in parallel with each other. The pixel electrode 13 and the auxiliary capacitance electrode 4 are stacked with an insulating film therebetween. In this example, the pixel electrode 13 is formed above the auxiliary capacitance electrode 4. Then, the auxiliary capacitance electrode 4 is formed to be larger than the pixel electrode 13 when seen from above. In summary, the auxiliary capacitance electrode 4 is formed so as to extend beyond the pattern of the pixel electrode 13. Accordingly, there is auxiliary capacitance electrode 4 also in a region between each of the comb-tooth electrodes. Then, the electric field according to the display voltage is generated between the end parts of each comb-tooth electrode of the pixel electrode 13 and the auxiliary capacitance electrode 4. The electrical field is generated between the both sides of each comb-tooth electrode and the pixel electrode 13 from the pixel electrode 13 to the underlying auxiliary capacitance electrode 4. More specifically, the fringe electric field in an oblique direction with respect to the substrate surface is generated. The liquid crystal molecules are driven by the fringe electric field to perform the display.

Figure 9:
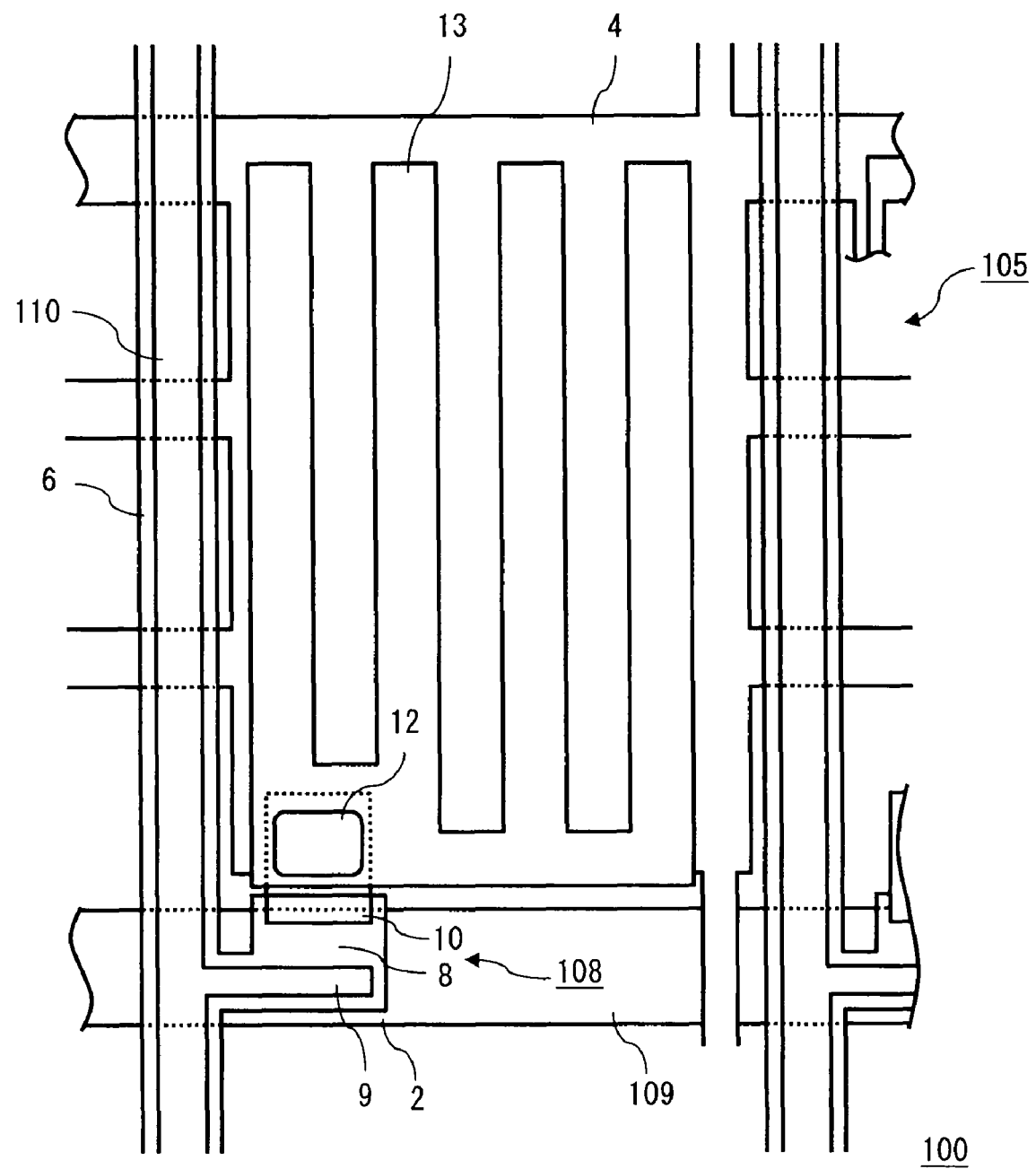
FIG. 9 is a top schematic view showing another structure of the pixel of the TFT array substrate according to the second embodiment.
Figure 10:
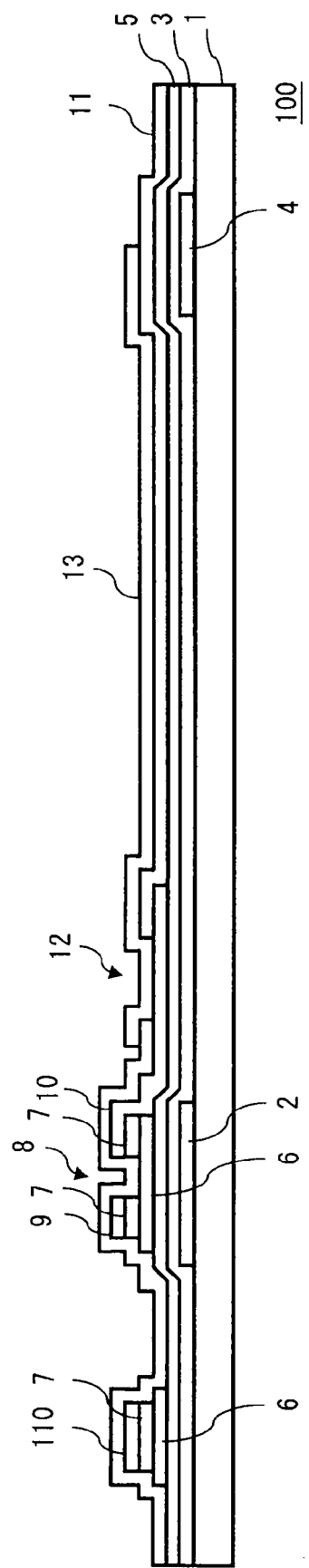
FIG. 10 is a cross sectional view schematically showing the structure of a related TFT array substrate.

Now, with reference to FIG. 9, the TFT array substrate 100 according to the second embodiment will be described. FIG. 9 is a top schematic view showing another structure of the pixel 105 of the TFT array substrate 100.

In FIG. 9, six intersections of the auxiliary capacitance electrode 4 with the source signal line 110 are formed. More specifically, in one pixel, the auxiliary capacitance electrode 4 traverses the source signal line 110 in three points in one side. Thus, it is possible to further reduce the resistance of the auxiliary capacitance electrode 4 compared with the TFT array substrate 100 shown in FIG. 8. The other structures are the same as those of the TFT array substrate 100 of FIG. 8. As such, the number of intersections of the auxiliary capacitance electrode 4 with the source signal line 110 can be changed as appropriate.

As shown in FIGS. 8 and 9, the present invention can be applied to the FFS-driven liquid crystal display device as well. The second embodiment also realizes the same effect as the first embodiment. Further, the resistance of the auxiliary capacitance electrode 4 can be made further lower compared with the first embodiment.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An active matrix substrate including a TFT, the active matrix substrate comprising:
    a gate signal line electrically connected to a gate electrode of the TFT;
    a first insulating film formed above the gate signal line;
    a common electrode formed above the first insulating film and supplied with a common potential;
    a second insulating film formed above the common electrode;
    a source signal line formed above the second insulating film and electrically connected to a source electrode of the TFT;
    a third insulating film formed above the source signal line; and
    a pixel electrode formed above the third insulating film so that the pixel electrode overlaps with a part of the common electrode, wherein the common electrode includes a main part having a first width and a protrusion having a second width different from the first width and extending away from the main part in a direction adjacent to the source signal line.

2. The active matrix substrate according to claim 1, wherein the common electrode is formed of a conductive transparent material.

3. The active matrix substrate according to claim 1, wherein the common electrode crosses the gate signal line.

4. The active matrix substrate according to claim 1, wherein the common electrode crosses the source signal line.

5. The active matrix substrate according to claim 1, further comprising a common line electrically connected to the common electrode and formed in a same layer as the gate signal line.

6. The active matrix substrate according to claim 1, wherein the first width is greater than the second width.

7. The active matrix substrate according to claim 1, wherein the common electrode forms a lattice shape.

8. A method of manufacturing an active matrix substrate including a TFT, the method comprising:
    forming a gate signal line electrically connected to a gate electrode of the TFT;
    forming a first insulating film above the gate signal line;
    forming a common electrode above the first insulating film, the common electrode being supplied with a common potential;
    forming a second insulating film above the common electrode;
    forming a source signal line above the second insulating film, the source signal line being electrically connected to a source electrode of the TFT;
    forming a third insulating film above the source signal line; and
    forming a pixel electrode above the third insulating film so that the pixel electrode overlaps with a part of the common electrode, wherein the common electrode includes a main part having a first width and a protrusion having a second width different from the first width and extending away from the main part in a direction adjacent to the source signal line.

9. The method of manufacturing the active matrix substrate according to claim 8, wherein the common electrode is formed of a conductive transparent material.

10. The method of manufacturing the active matrix substrate according to claim 8, wherein the common electrode is formed to cross the gate signal line.

11. The method of manufacturing the active matrix substrate according to claim 8, wherein the common electrode is formed to cross the source signal line.

12. The method of manufacturing the active matrix substrate according to claim 8, wherein a common line electrically connected to the common electrode is further formed when the gate signal line is formed.

13. The method of manufacturing the active matrix substrate according to claim 8, wherein the first width is greater than the second width.

14. The method of manufacturing the active matrix substrate according to claim 8, wherein the common electrode forms a lattice shape.

* * * * *